UNITED STATES PATENT OFFICE.

PER WESTIN, OF STOCKHOLM, SWEDEN.

PROCESS OF CONCENTRATING SOLUTIONS.

1,315,889.  Specification of Letters Patent.  Patented Sept. 9, 1919.

No Drawing.  Application filed February 28, 1919.  Serial No. 279,890.

*To all whom it may concern:*

Be it known that I, PER WESTIN, engineer, subject of the King of Sweden, residing at 54 Sturegatan, Stockholm, Sweden, have invented certain new and useful Improvements in Processes of Concentrating Solutions, of which the following is a specification.

The present invention relates to a method of recovering organic and inorganic constituents of solutions, particularly waste liquors from sulfite mills and from factories in which alcohol is produced from such liquor. The invention comprises especially mixing the liquor with a suitable absorbent material, which also may be carbonizable, such as refuse wood, moss-litter, etc. This mixing can be done by floating the absorbent in the liquors treated. After this the mixture is dried. The drying having proceeded so far that the absorbent is capable of absorbing more liquor, the same is mixed or floated with an additional quantity of the liquor. In this way the process is continued until the absorbent becomes saturated. The proper fraction of the water of the last quantity of added liquor having been evaporated, the saturated absorbent is pressed, by which operation a liquor of higher concentration is obtained, which liquor can then be worked to greater advantage for the ingredients contained therein, for instance in the process of producing alcohol therefrom. The absorbent, after pressing, which always contains a certain quantity of the ingredients of the sulfite liquor, is again saturated with new liquor, whereupon it is again squeezed out after having been completely saturated. These operations may be repeated, until the absorbent has been so impregnated with the solid matter contained in the liquor that it cannot absorb any further considerable quantity of liquor. The absorbent is now formed into briquets which, upon drying, constitute an excellent fuel which may be advantageously coked, such operation producing a very high yield of by-products. If it is only desired to produce alcohol and solid fuel, the saturation of the squeezed absorbent is effected with the residuary liquors from the alcohol manufacturing plant. As absorbing material, finely divided refuse wood, such as bark, etc., as well as peat-litter, peat-dust, broken charcoal, coal, ordinary coke or the coke of the sulfite briquets produced, may be used, or other suitable absorbents can be employed. Other waste liquor, or waste water also, for instance the liquors or waters from sugar mills may be enriched in this manner for the purpose of recovering the valuable substances contained therein.

When using bark refuse of those varieties which have a higher percentage of sugar, tannins, etc., than does ordinary wood, part of these easily soluble substances are dissolved. The liquor squeezed out from the partly dried absorbent, therefore, contains a higher percentage of these substances than would be present in merely concentrated sulfite liquor. A further advantage resides in the simultaneous reduction of the percentage of lignin in the liquor, which is caused partly by its relatively poor solubility, and partly by its adhesiveness, by which it tends to adhere to the absorbent mass. The squeezed out enriched liquor, therefore, constitutes a more valuable raw material, than does the raw liquor, for the production of such products as alcohol from sulfite liquor or tanning extract from sulfite liquor.

The invention may also be advantageously applied to various solutions other than waste liquors, for instance in the concentrating of salt solutions from sea water.

I claim:

1. A method of concentrating solutions, which comprises alternately mixing an absorbent material with the solution, and drying the mixture, and repeating the said operations until a desired quantity of the dried solution residue is contained in the product, such drying operations being performed at a sufficiently low temperature to prevent charring of the dried contents of the liquor, whereby the solubility thereof would be destroyed.

2. A process of concentrating sulfite waste liquors, which comprises mixing the said liquors with an organic absorbent material, drying the mixture, repeating said operations until a desired quantity of the liquor solids are obtained in the product, and thereafter again mixing such dried material with an additional quantity of the said liquor, and squeezing the mass to obtain a concentrated liquor.

3. In the method of claim 5, the improvement which comprises employing organic absorbent material containing soluble constituents, for the purpose of enriching the liquor in such constituents.

4. A process which comprises mixing waste wood pulp liquor with an organic combustible absorbent material, drying the mixture, and repeating such operations until a considerable quantity of the dried liquor residue remains in the product, again mixing the product with pulp liquor and squeezing to produce a concentrated liquor, and repeating such operations until the absorptive power of the said organic material has substantially decreased, and briqueting the absorbent material.

5. A briquet comprising an absorbent material and a binder consisting of chemically altered wood pulp liquor organic solids, such binder containing substantially less percentage of the readily soluble solids of the wood pulp liquor than does the original waste wood pulp liquor, such binder being in a non-charred condition.

In testimony whereof I affix my signature in presence of two witnesses.

PER WESTIN.

Witnesses:
OSCAR GRAHN,
JACOB BAGGE.

Copies of this patent may be obtained for five cents each, by addressing the "Commissioner of Patents, Washington, D. C."